US007856110B2

(12) United States Patent
Fujita et al.

(10) Patent No.: US 7,856,110 B2
(45) Date of Patent: Dec. 21, 2010

(54) AUDIO PROCESSOR

(75) Inventors: Takeshi Fujita, Osaka (JP); Tomoko Sakakibara, Osaka (JP); Eriko Kanki, Osaka (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 10/569,421

(22) PCT Filed: Feb. 24, 2005

(86) PCT No.: PCT/JP2005/003044

§ 371 (c)(1), (2), (4) Date: Feb. 23, 2006

(87) PCT Pub. No.: WO2005/084077

PCT Pub. Date: Sep. 9, 2005

(65) Prior Publication Data

US 2007/0014417 A1 Jan. 18, 2007

(30) Foreign Application Priority Data

Feb. 26, 2004 (JP) ............................ 2004-051106

(51) Int. Cl.
*H04R 5/02* (2006.01)
*H04R 5/00* (2006.01)
*H02B 1/00* (2006.01)

(52) U.S. Cl. ......................... 381/310; 381/307; 381/17; 381/18; 381/19; 381/123

(58) Field of Classification Search ............. 381/17–19, 381/307, 310, 309, 27, 81, 123
See application file for complete search history.

(56) References Cited

U.S. PATENT DOCUMENTS

| | | | | |
|---|---|---|---|---|
| 5,197,099 | A * | 3/1993 | Hirasawa | 381/27 |
| 5,285,503 | A * | 2/1994 | Satoh et al. | 381/109 |
| 5,491,755 | A * | 2/1996 | Vogt et al. | 381/86 |
| 5,680,464 | A | 10/1997 | Iwamatsu | |
| 6,222,930 | B1 | 4/2001 | Nakano et al. | |
| 6,385,320 | B1 * | 5/2002 | Lee | 381/17 |

(Continued)

FOREIGN PATENT DOCUMENTS

JP 06-233394 8/1994

(Continued)

OTHER PUBLICATIONS

Japanese Office Action, with English translation, issued in Japanese Patent Application No. 2006-519373, mailed Feb. 9, 2010.

*Primary Examiner*—Vivian Chin
*Assistant Examiner*—George Monikang
(74) *Attorney, Agent, or Firm*—McDermott Will & Emery LLP

(57) ABSTRACT

To realize virtual surround reproduction with small deterioration in the SN ratio of an entire reproduction system, in the case of adding together virtual surround signals and front-channel audio signals in an adder 1300, volume normalization is carried out in a volume normalizing section 1200 before the addition. In the case where the addition is not performed, the virtual surround signals and the front-channel audio signals are output independently of each other without being subjected to volume normalization in the volume normalizing section 1200.

6 Claims, 12 Drawing Sheets

U.S. PATENT DOCUMENTS

| | | | | |
|---|---|---|---|---|
| 2003/0099369 | A1 * | 5/2003 | Cheng | 381/309 |
| 2004/0151325 | A1 | 8/2004 | Hooley et al. | |

FOREIGN PATENT DOCUMENTS

| | | |
|---|---|---|
| JP | 6-291571 | 10/1994 |
| JP | 08-116597 | 5/1996 |
| JP | 8-130797 | 5/1996 |
| JP | 08-275300 | 10/1996 |
| JP | 09-322300 | 12/1997 |
| JP | 10-174197 | 6/1998 |
| JP | 2000-324600 | 11/2000 |
| JP | 2003-322559 | 11/2003 |
| WO | WO 02/078388 A2 | 10/2002 |

* cited by examiner

| | Rear loudspeaker layout information | | |
|---|---|---|---|
| | Rear layout | Front layout (external addition) | None |
| Virtual surround processing section | OFF | ON | ON |
| Volume normalizing section | OFF | OFF | ON (−3dB in all channels ) |
| Output switching section | through | through | Adder side output |
| Automatic volume controller | OFF | OFF | ON |

AUDIO PROCESSOR

This application is the U.S. National Phase under 35 U.S.C. §371 of International Application No. PCT/JP2005/003044, filed Feb. 24, 2005, which in turn claims the benefit of Japanese Application No. 2004-051106, filed Feb. 26, 2004, the disclosures of which Applications are incorporated by reference herein in their entirety.

TECHNICAL FIELD

The present invention relates to an audio processor which realizes multichannel reproduction in a virtual manner only with front loudspeakers placed in front of a listener.

BACKGROUND ART

With the advent of the sound sources compliant with multichannel audio reproduction, such as DVD (Digital Versatile Disc), BS digital broadcasting, etc., in order to allow a user who has only a 2-channel loudspeaker system to enjoy multichannel reproduction, various audio processors which realizes multichannel reproduction in a virtual manner only with front loudspeakers have been developed. Specifically, in such an audio processor, to reproduce audio signals for rear channels through loudspeakers placed in front of a listener, the audio signals are subjected to sound image localization such that the sound image position which is perceived by the listener is at the rear of the listener (virtual surround processing).

A known example of such an audio processor is an audio processor 4000 which adds together signals obtained by performing the virtual surround processing on rear-channel audio signals (virtual surround signals) and front-channel audio signals to output audio PCM signals for the front loudspeakers as shown in FIG. 12 (see Patent Document 1 and Patent Document 2).

The audio processor 4000 includes a virtual surround processing section 4100, a volume normalizing section 4200, and an adder 4300.

Among externally-input audio PCM signals of 4 channels in total, i.e., front-channel audio signals for front left and right reproduction (2 channels for left and right) and rear-channel audio signals for rear left and right reproduction (2 channels for left and right), the virtual surround processing section 4100 performs the virtual surround processing on the rear-channel audio signals to output virtual surround signals.

The volume normalizing section 4200 performs a process on the front-channel audio signals and the virtual surround signals such that the volume levels of the signals are within a predetermine level range (volume normalization). The volume normalization is performed for the purpose of preventing occurrence of an overflow in the addition of the front-channel audio signals and the virtual surround signals.

The adder 4300 adds together the front-channel audio signals and the virtual surround signals which have been volume-normalized by the volume normalizing section 4200.

When front-channel audio signals and rear-channel audio signals are input from the outside of the thus-constructed audio processor 4000, the virtual surround processing section 4100 performs the virtual surround processing on the front-channel audio signals to output virtual surround signals to the volume normalizing section 4200. After the volume normalizing section 4200 performs the volume normalization on the front-channel audio signals and the virtual surround signals, these normalized signals are added together by the adder 4300 and output as audio PCM signals for front loudspeakers.

As described above, in the audio processor 4000, the virtual surround processing is performed on rear-channel audio signals, whereby multichannel reproduction is realized in a virtual manner only with front loudspeakers.

Another example of an audio processor which realizes multichannel reproduction in a virtual manner is an audio processor 5000 wherein reflection sound creation processing which creates reflection sound in a virtual manner is performed on 2-channel audio PCM signals for front left and right reproduction (2-channel stereo audio signals) which are input from the outside of the audio processor to generate pseudo rear-channel audio signals (see, for example, Patent Document 3).

The audio processor 5000 includes a virtual surround processing section 4100, a volume normalizing section 4200, an adder 4300, and a reflection sound processing section 5400.

The reflection sound processing section 5400 performs a process which creates reflection sound in a virtual manner (reflection sound creation processing) on 2-channel stereo audio signals to output rear-channel audio signals.

In the thus-constructed audio processor 5000, the reflection sound processing section 5400 performs the reflection sound creation processing on 2-channel stereo audio signals to output pseudo rear-channel audio signals. These rear-channel audio signals are subjected to the virtual surround processing in the virtual surround processing section 4100. The virtual surround-processed signals and the stereo audio signals of the channels are subjected to volume normalization in the volume normalizing section 4200 and added together at the adder 4300.

That is, in the audio processor 5000, 2-channel stereo audio signals are subjected to sound image expansion processing and added to the original signals, whereby multichannel reproduction that achieves a stereophonic effect in a virtual manner is realized.

[Patent Document 1] Japanese Laid-Open Patent Publication No. 6-233394

[Patent Document 2] Japanese Laid-Open Patent Publication No. 10-174197

[Patent Document 3] Japanese Laid-Open Patent Publication No. 8-116597

DISCLOSURE OF THE INVENTION

Problems to be Solved by the Invention

A trend in audio processors (or video/audio processors which also process video signals) targeting the systems which have been rapidly propagating in recent years, such as DVD and the like, exhibits higher performance and higher sound quality which are demanded in consideration of hi-fi users as targets. However, when virtual surround signals and front-channel audio signals are added together, the SN ratio can be deteriorated due to normalization which is performed for avoiding an overflow during the addition.

In an audio processor in which the presence/absence (ON/OFF) of the virtual surround processing can be switched, the play volume is decreased by volume normalization not only when the virtual surround processing is ON but also when the virtual surround processing is OFF in order to adjust the sound voluminosity between ON and OFF of the virtual surround processing. As a result, the SN ratio of the entire system is deteriorated.

When rear loudspeakers are inevitably placed in front of a listener for user's convenience even with a multichannel-reproducible system, reproduction has to be carried out with the output of the rear loudspeakers being OFF. As a result, as in a 2-channel reproduction system, the SN ratio is deteriorated by normalization which is performed for avoiding an overflow.

The present invention was conceived in view of the above problems. An objective of the present invention is to provide an audio processor capable of virtual surround reproduction with small deterioration in the SN ratio of the entire reproduction system.

Means for Solving the Problems

In order to achieve the above objective, the invention of claim 1 is an audio processor which comprises an audio processing section for performing a predetermined sound image localization process on a rear-channel audio signal whose sound image position perceived by a listener when reproduced through a loudspeaker placed at the rear of the listener is at the rear of the listener such that the sound image position perceived by the listener when the signal is reproduced through a loudspeaker placed in front of the listener is at the rear of the listener to generate a sound image localized audio signal, wherein a front-channel audio signal whose sound image position perceived by the listener when reproduced through the loudspeaker placed in front of the listener is in front of the listener and the sound image localized audio signal are output independently of each other.

The invention of claim 2 is based on the audio processor of claim 1 and further comprises a reflection sound creation section for performing a reflection sound creation process on an input front-channel audio signal to generate the rear-channel audio signal.

The invention of claim 3 is based on the audio processor of claim 1 and further comprises a reflection sound adding section for adding a reflection sound signal to each of an input front-channel audio signal and an input rear-channel audio signal to generate the front-channel audio signal and the rear-channel audio signal.

With these inventions, the front-channel audio signal and the sound image localized audio signal are output independently of each other. Thus, in the case where the front-channel audio signal and the sound image localized audio signal are added together in an external analog circuit, virtual surround reproduction is enabled without deterioration in the SN ratio.

The invention of claim 4 is based on the audio processor of claim 1 and further comprises: a volume normalizing section for controlling the volume level of the front-channel audio signal and the sound image localized audio signal to be within a predetermined level range; an adder for adding together the front-channel audio signal whose volume level has been controlled in the volume normalizing section and the sound image localized audio signal whose volume level has been controlled in the volume normalizing section to generate a sum audio signal; and a switching section for selectively performing an operation of outputting the front-channel audio signal and the sound image localized audio signal independently of each other and an operation of outputting the sum audio signal according to a control signal indicative of output control information.

With this invention, the output operation is switched according to an input control signal.

The invention of claim 5 is based on the audio processor of claim 4, wherein: the output control information includes output channel type information which is indicative of an output channel type; and the switching section performs the switching according to the output channel type information.

With this invention, the output operation is switched according to the output channel type.

The invention of claim 6 is based on the audio processor of claim 5 and further comprises a volume controller for controlling the volume level of an output audio signal according to the output channel type information and an input volume level.

With this invention, the level of an output audio signal is controlled according to the output channel type, and optimum volume control is realized.

The invention of claim 7 is based on the audio processor of claim 4, wherein: the output control information includes rear loudspeaker layout information indicative of whether a layout of a loudspeaker for rear sound image through which an audio signal is output such that a sound image position perceived by a listener is at the rear of the listener is a layout where the loudspeaker is placed in front of the listener, a layout where the loudspeaker is placed at the rear of the listener, or a layout where the loudspeaker is not provided; the audio processing section controls whether or not to generate the sound image localized audio signal according to the layout indicated by the rear loudspeaker layout information; and the switching section selectively performs according to the rear loudspeaker layout information an operation of outputting the front-channel audio signal and the sound image localized audio signal independently of each other, an operation of outputting the sum audio signal, and an operation of outputting an input audio signal as it is.

With this invention, the presence/absence of sound image localization or the output operation is switched according to the layout of loudspeakers through which output is realized.

The invention of claim 8 is based on the audio processor of claim 7 and further comprises a volume controller for controlling the volume level of an output audio signal according to the rear loudspeaker layout information and an input volume level.

With this invention, the level of an output audio signal is controlled according to the layout of loudspeakers through which output is realized.

EFFECTS OF THE INVENTION

According to the present invention, virtual surround reproduction can be realized with small deterioration in the SN ratio of an entire reproduction system.

DESCRIPTION OF THE REFERENCE NUMERALS

1000 Audio processor
1100 Virtual surround processing section
1200 Volume normalizing section
1300 Adder
1400 Output switching section
1500 External interface
1700 Automatic volume controller
2000 Audio processor
2500 External interface
2600 Reflection sound processing section
2700 Automatic volume controller
3000 Audio processor
3100 Virtual surround processing section
3200 Volume normalizing section
3400 Output switching section
3500 External interface
3600 Reflection sound processing section
3700 Automatic volume controller
4000 Audio processor
4100 Virtual surround processing section
4200 Volume normalizing section
4300 Adder
5000 Audio processor
5400 Reflection sound processing section

BEST MODE FOR CARRYING OUT THE INVENTION

Hereinafter, embodiments of the present invention will be described with reference to the drawings.

Embodiment 1

Figure 1:
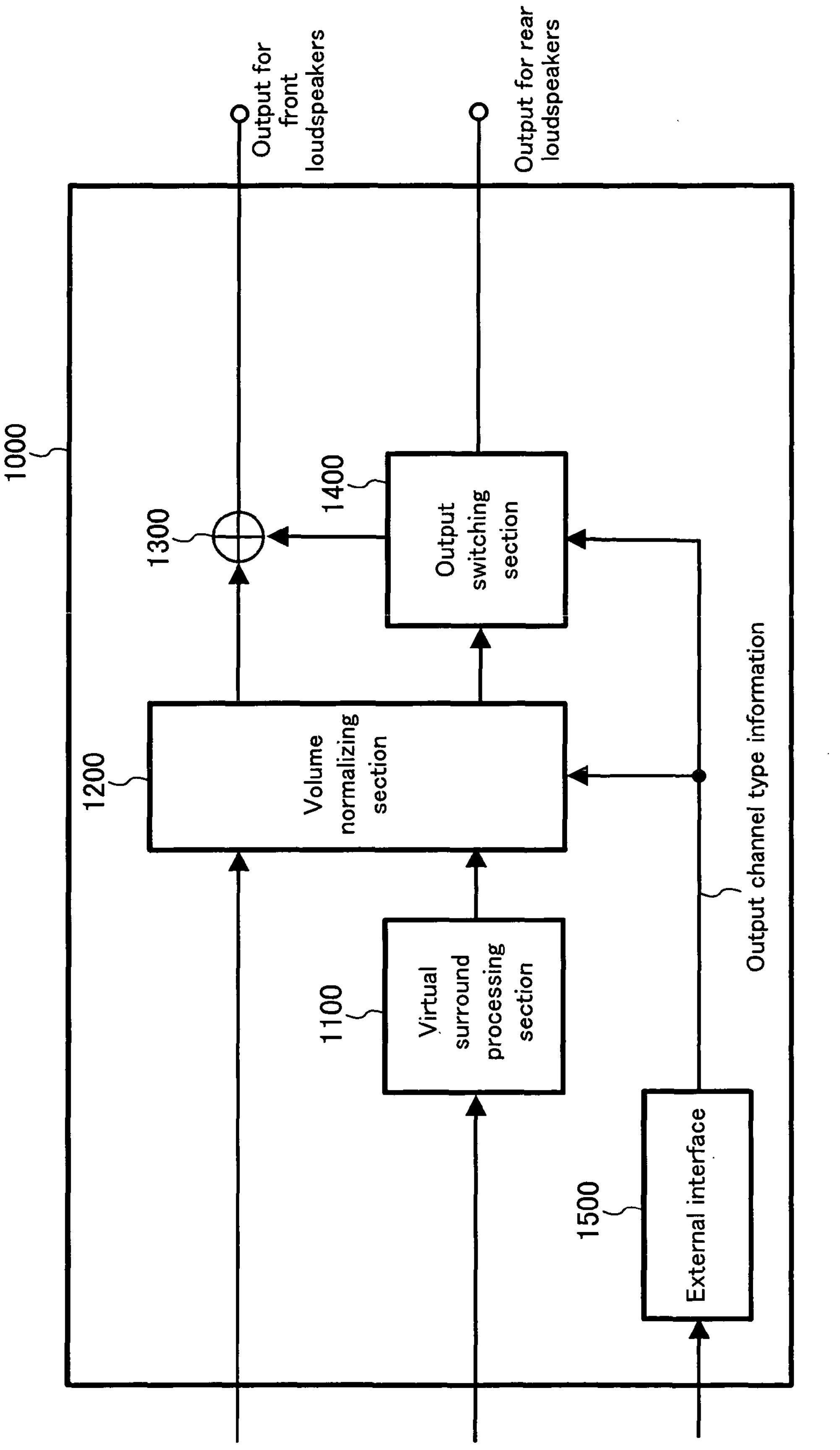
FIG. 1 is a block diagram showing a structure of an audio processor according to embodiment 1 of the present invention.

FIG. 1 is a block diagram showing a structure of an audio processor 1000 according to embodiment 1 of the present invention. As shown in FIG. 1, the audio processor 1000 includes a virtual surround processing section 1100, a volume normalizing section 1200, an adder 1300, an output switching section 1400, and an external interface 1500.

Specifically, the audio processor 1000 is formed by a DSP (Digital Signal Processor), or the like, and performs a predetermined process on externally-input audio PCM signals of 4 channels in total, i.e., front-channel audio signals for front left and right reproduction and rear-channel audio signals for rear left and right reproduction, to performs the following two types of output operations.

The output operation of the first type is such that, in order to reproduce audio signals for rear channels through loudspeakers placed in front of a listener, the rear-channel audio signals are subjected to sound image localization such that the sound image position perceived by the listener is at the rear of the listener (virtual surround processing), the processed audio signals are added to the rear-channel audio signals, and the resultant signals are output as 2-channel signals for front loudspeakers. With the output signals, multichannel reproduction can be realized in a virtual manner only with the front loudspeakers (virtual surround reproduction).

The output operation of the second type is the operation of outputting signals of 4 channels, i.e., the front-channel audio signals and the virtual surround processed signals (virtual surround signals). For example, where the output front-channel signals and the virtual surround signals are added together in an external analog circuit, and the resultant signals are output through the front loudspeakers, or where the rear loudspeakers are placed in front of a listener for user's convenience, if the virtual surround signals are output through the rear loudspeakers placed in front of the listener, virtual surround reproduction is realized also in this case.

Selection of the output operation type is controlled based on the output control information (described later) which is input from the outside of the audio processor 1000.

In embodiment 1, this output control information is output channel type information indicative of whether or not the output format is 2-channel output format where the channel type of audio PCM signals output to the outside is 2-channel format or 4-channel output format where the channel type of audio PCM signals output to the outside is 4-channel format.

The virtual surround processing section 1100 performs the virtual surround processing on the rear-channel audio signals to output the virtual surround signals.

When the output channel type information indicates 2-channel output format, the volume normalizing section 1200 performs volume normalization such that the volume of the front-channel audio signals and the virtual surround signals is decreased by 6 dB. When the output channel type information indicates 4-channel output format, the volume normalizing section 1200 simply passes the front-channel audio signals and the virtual surround signals therethrough. The reason why the volume normalization is performed in the case of 2-channel output format is in order to prevent occurrence of an overflow in the addition of the front-channel audio signals and the virtual surround signals.

The adder 1300 adds together the front-channel audio signals which have been subjected to the volume normalization in the volume normalizing section 1200 and the virtual surround signals output from the output switching section 1400.

When the output channel type information indicates 2-channel output format, the output switching section 1400 outputs to the adder 1300 the virtual surround signals output from the volume normalizing section 1200. When the output channel type information indicates 4-channel output format, the output switching section 1400 outputs signals for the rear loudspeakers to the outside of the audio processor 1000.

The external interface 1500 outputs the externally-input output control information to the volume normalizing section 1200 and the output switching section 1400.

Figure 2:
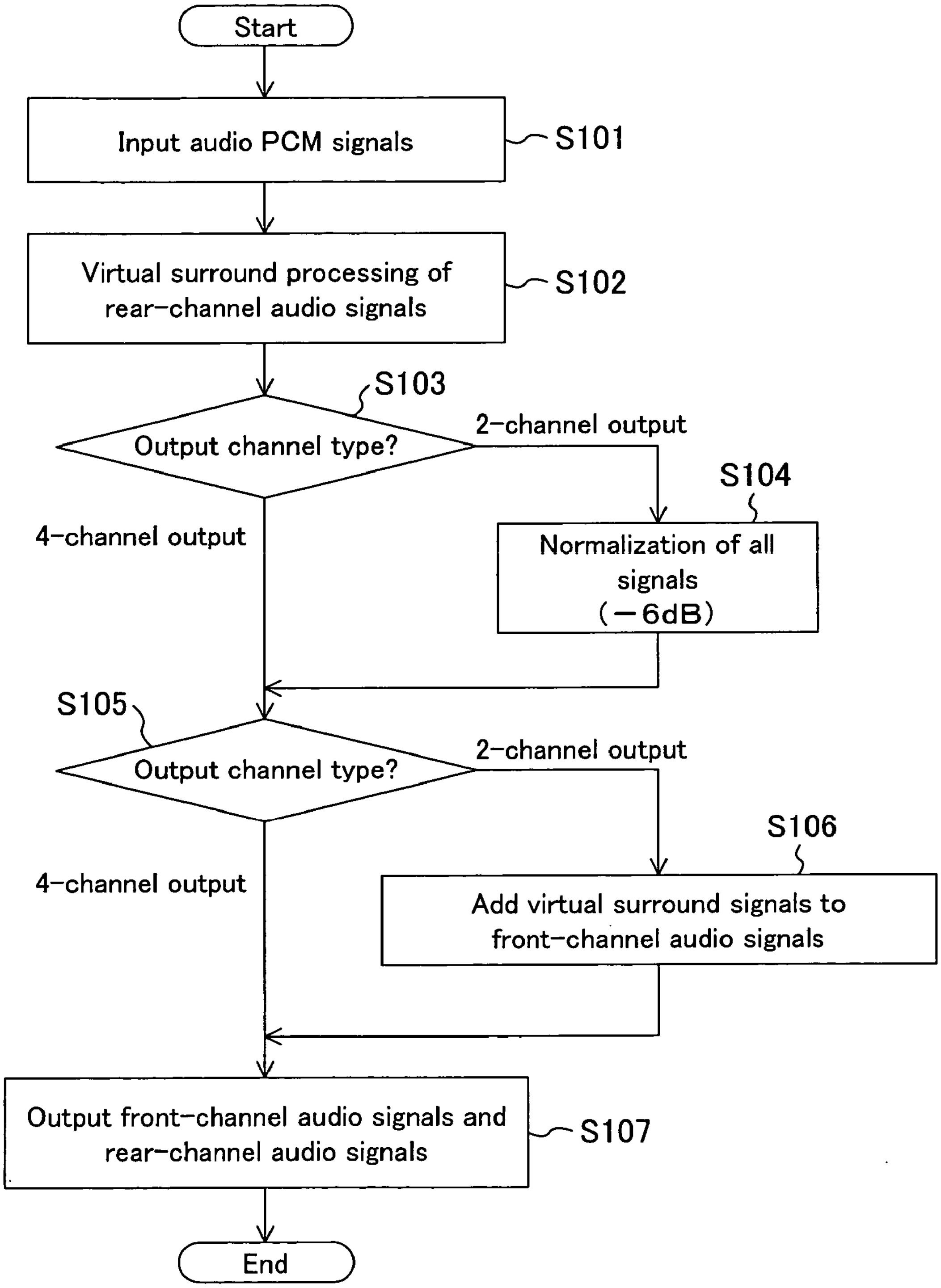
FIG. 2 is a flowchart illustrating an operation of the audio processor according to embodiment 1 of the present invention.

The audio processor 1000 as constructed above performs any of 4-channel output or 2-channel output according to the output control information through the processes of the steps illustrated in the flowchart of FIG. 2. At the respective steps, the following processes are performed.

Audio PCM signals of 4 channels in total, i.e., front-channel audio signals and rear-channel audio signals, are input to the virtual surround processing section 1100.

The virtual surround processing section 1100 performs the virtual surround processing on the rear channel audio signals to output the resultant signals as virtual surround signals to the volume normalizing section 1200.

The volume normalizing section 1200 determines whether the output channel type information output from the external interface 1500 indicates 2-channel output format or 4-channel output format in order to determine whether or not the volume normalization of the audio signals is necessary. In the case of 2-channel output format, the operation proceeds to the process of step S104. In the case of 4-channel output format, the volume normalizing section 1200 simply passes the front-channel audio signals and the virtual surround signals therethrough, and then, the operation proceeds to the process of step S105.

The volume normalizing section 1200 performs the volume normalization on the front-channel audio signals and the virtual surround signals. Specifically, the volume of these signals is decreased by 6 dB.

With this, occurrence of an overflow is prevented in the addition of the front-channel audio signals and the virtual surround signals.

The output switching section 1400 determines whether the output channel type information indicates 2-channel output format or 4-channel output format in order to determine to which section the virtual surround signals are to be output. In the case of 2-channel output format, the output switching section 1400 outputs the virtual surround signals to the adder 1300, and then, the operation proceeds to the process of step S106. In the case of 4-channel output format, the operation proceeds to the process of step S107.

The adder 1300 adds together the front-channel audio signals and the virtual surround signals, and then, the operation proceeds to the process of step S107.

The output of the adder 1300 is output as signals for the front loudspeakers while the output of the output switching section 1400 is output as signals for the rear loudspeakers.

By performing the processes of steps S101 through S107, any of 4-channel output and 2-channel output is performed according to the output control information.

For example, when the output channel type information indicates 2-channel output format (the output channel type is 2-channel output), the virtual surround processing section 1100 performs the virtual surround processing on the rear-channel audio signals to generate virtual surround signals. The volume of this virtual surround signals is decreased by 6 dB in the volume normalizing section 1200. Thereafter, the resultant virtual surround signals are output to the adder 1300 through the output switching section 1400. The adder 1300 adds together the virtual surround signals and the front-channel audio signals to output the resultant signals as signals for the front loudspeakers. In the process of addition, an overflow due to the addition process does not occur because the audio signals have been subjected to normalization in the volume normalizing section 1200.

When the output channel type information indicates 4-channel output format (the output channel type is 4-channel output), the virtual surround signals are generated as in the example of 2-channel output format. Thereafter, the front-channel audio signals are output as signals for the front loudspeakers, and the virtual surround signals are output as signals for the rear loudspeakers, without being subjected to the volume normalization in the volume normalizing section 1200 or the addition in the adder 1300. Herein, although the normalization is not performed on the audio signals in the volume normalizing section 1200, it is natural that no overflow occurs because the addition is not performed.

As described above, according to this embodiment, since the output switching section 1400 is provided, the virtual surround signals and the front-channel audio signals can be independently output without being added together. For example, in the case where front-channel signals and virtual surround signals are added together in an external analog circuit, virtual surround reproduction can be realized with a 2-channel loudspeaker system without deteriorating the SN ratio of an entire reproduction system.

With externally-input output channel type information, the presence/absence of volume normalization and the presence/absence of addition of the virtual surround signals and the front-channel audio signals are automatically switched according to an external output channel type. Thus, the volume is optimally set according to the form of a reproduction system, and as a result, the SN ratio of the entire reproduction system is automatically optimized.

Embodiment 2

An example of a processor described herein is capable of two types of output operations as in the processor of embodiment 1, i.e., 2-channel output format and 4-channel output format, although input audio signals are audio PCM signals of 2 channels for front left and right reproduction (stereo).

Figure 3:
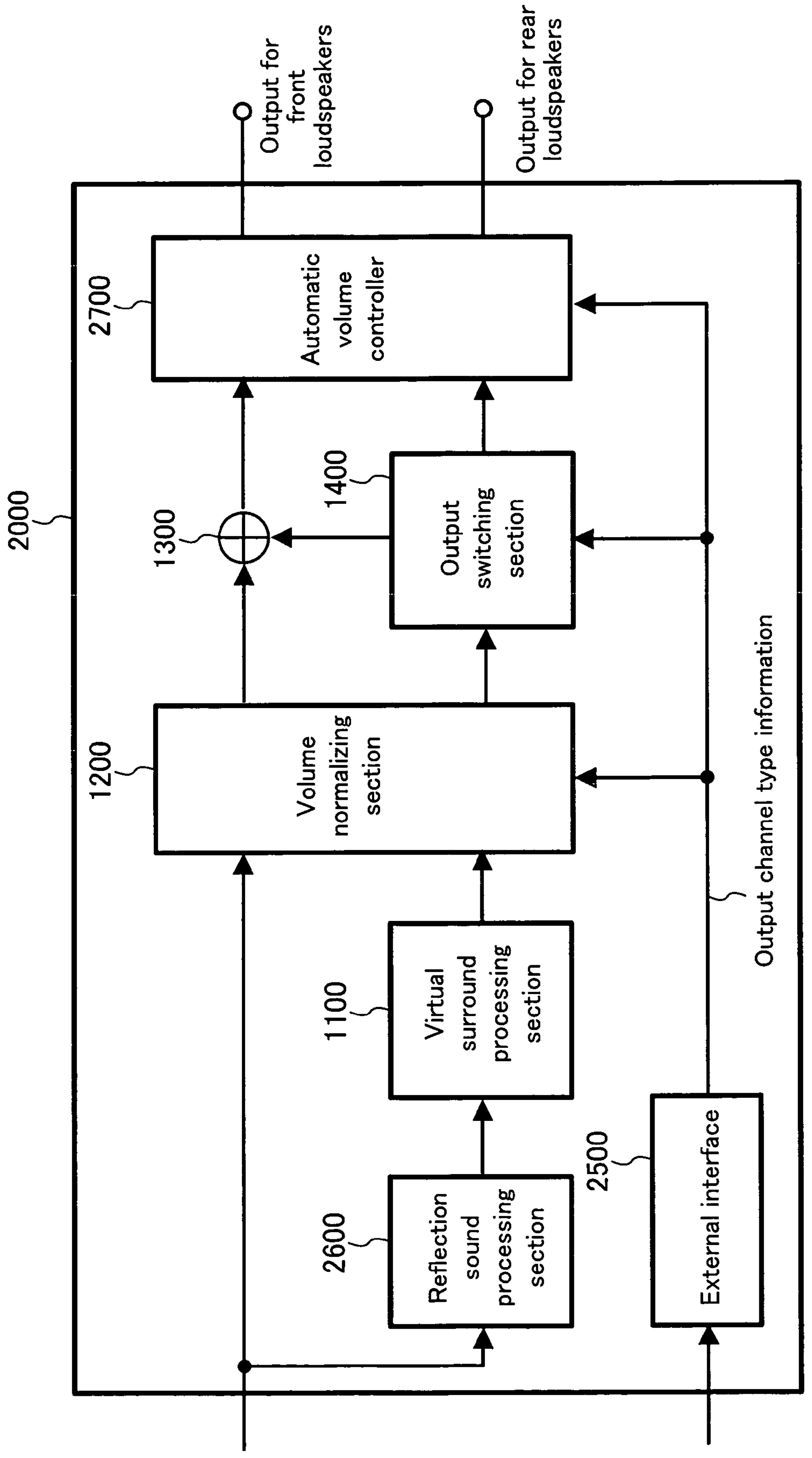
FIG. 3 is a block diagram showing a structure of an audio processor according to embodiment 2 of the present invention.

FIG. 3 is a block diagram showing a structure of an audio processor 2000 according to embodiment 2 of the present invention. In the following sections, components that have the same functions as those of embodiment 1 are denoted by the same reference numerals, and the descriptions thereof are herein omitted.

As shown in FIG. 3, the audio processor 2000 includes an external interface 2500 in substitution for the external interface 1500 of embodiment 1 and further includes a reflection sound processing section 2600 and an automatic volume controller 2700. The audio processor 2000 selects any of 2-channel output format and 4-channel output format based on the output control information. Specifically, the audio processor 2000 is also formed by a DSP, or the like.

The external interface 2500 outputs the above-described output channel type information to the volume normalizing section 1200, the output switching section 1400, and the automatic volume controller 2700.

The reflection sound processing section 2600 performs on externally-input stereo audio PCM signals (front-channel audio signals) the process of creating reflection sound in a virtual manner and adding the created reflection sound to the stereo audio PCM signals (reflection sound creation processing), thereby generating pseudo rear-channel signals.

The automatic volume controller 2700 performs volume control according to the sound level of input signals only when the output channel type information indicates 2-channel output format. For example, when the volume level of the input signals is an excessively large level, the volume level is automatically smoothed or compressed. Although an overflow is more likely to occur when a plurality of audio signals are added together, the overflow state can be relaxed by automatic volume control of the automatic volume controller 2700.

In embodiment 2, the volume normalizing section 1200 decreases the level of the input signals by 3 dB, while in embodiment 1 the volume normalizing section 1200 decreases the level of the input signals by 6 dB. The reason why the decrease in signal level by the volume normalizing section 1200 is 3 dB in embodiment 2 is that the audio processor 2000 includes the automatic volume controller 2700, and accordingly, some degree of overflow can be avoided.

Figure 4:
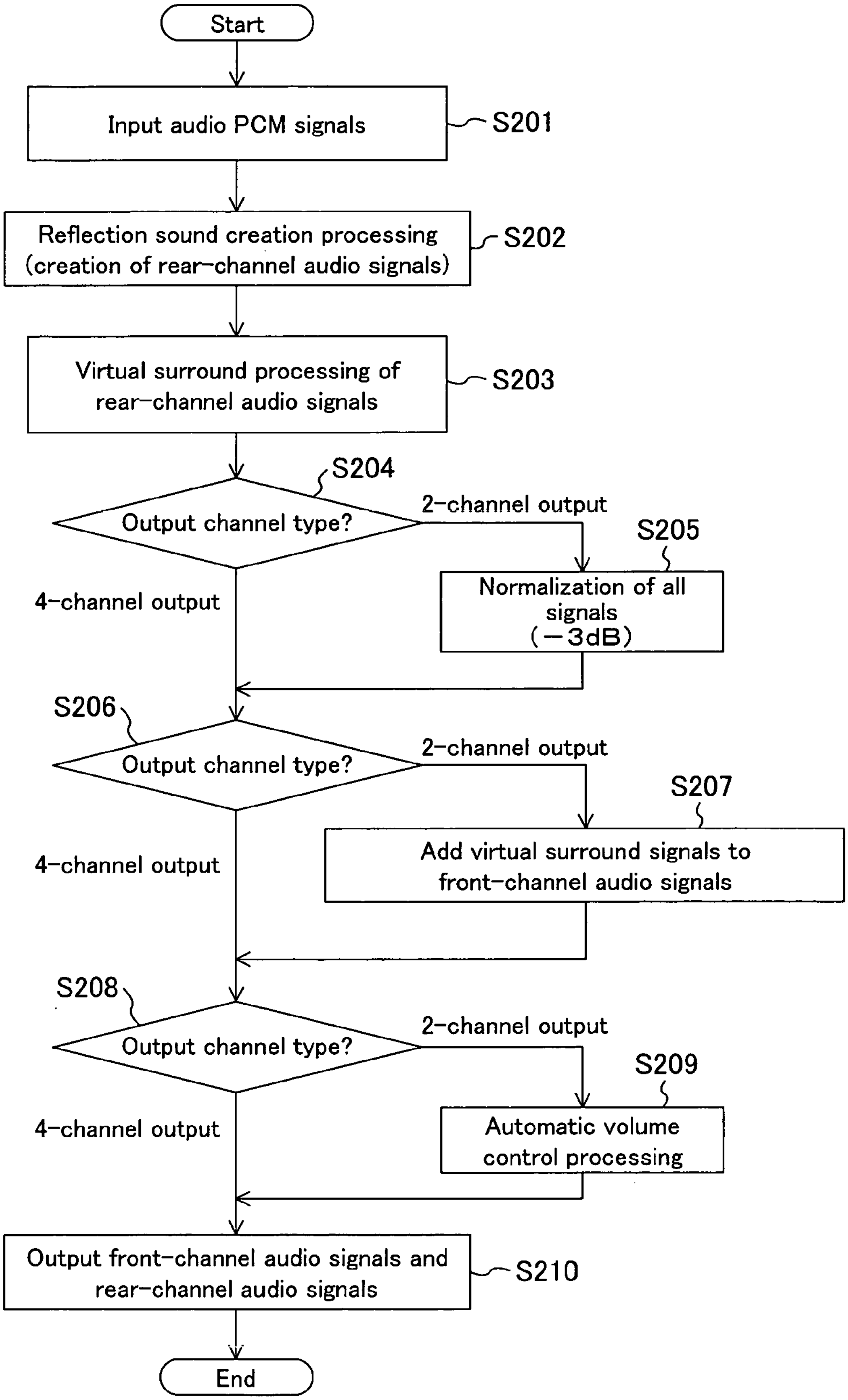
FIG. 4 is a flowchart illustrating an operation of the audio processor according to embodiment 2 of the present invention.

The audio processor 2000 as constructed above performs any of 4-channel output or 2-channel output according to the output control information through the processes of the steps illustrated in the flowchart of FIG. 4. At the respective steps, the following processes are performed.

Audio PCM signals are input to the virtual surround processing section 1100 and the reflection sound processing section 2600.

The reflection sound processing section 2600 performs the reflection sound creation processing on front-channel audio signals to generate pseudo rear-channel audio signals.

The virtual surround processing section 1100 performs the virtual surround processing on the pseudo rear channel audio signals to output the resultant signals as virtual surround signals to the volume normalizing section 1200.

The volume normalizing section 1200 determines whether the output channel type information output from the external interface 2500 indicates 2-channel output format or 4-channel output format in order to determine whether or not the volume normalization of the audio signals is necessary. In the case of 2-channel output format, the operation proceeds to the process of step S205. In the case of 4-channel output format, the volume normalizing section 1200 simply passes the front-channel audio signals and the virtual surround signals therethrough, and then, the operation proceeds to the process of step S206.

The volume normalizing section 1200 performs the volume normalization on the front-channel audio signals and the virtual surround signals. Specifically, the volume of these signals is decreased by 3 dB.

With this, occurrence of an overflow is prevented in the addition of the front-channel audio signals and the virtual surround signals.

The output switching section 1400 determines whether the output channel type information indicates 2-channel output format or 4-channel output format in order to determine to which section the virtual surround signals are to be output. In the case of 2-channel output format, the output switching section 1400 outputs the virtual surround signals to the adder 1300, and then, the operation proceeds to the process of step S106. In the case of 4-channel output format, the operation proceeds to the process of step S107.

The adder 1300 adds together the front-channel audio signals and the virtual surround signals, and then, the operation proceeds to the process of step S107.

The automatic volume controller 2700 determines whether the output channel type information indicates 2-channel output format or 4-channel output format in order to determine whether or not the automatic volume control is necessary. In the case of 2-channel output format, the operation proceeds to the process of step S209 for volume adjustment. In the case of 4-channel output format (i.e., when volume adjustment is unnecessary), the operation proceeds to the process of step S210.

The automatic volume controller 2700 adjusts the volume of the front-channel audio signals and the virtual surround signals by smoothing or compressing the volume level.

Outputs of the automatic volume controller 2700 are output as signals for the front loudspeakers and signals for the rear loudspeakers.

By performing the processes of steps S201 through S210, any of 4-channel output and 2-channel output is performed according to the output control information.

For example, when the output channel type information indicates 2-channel output format, the reflection sound processing section 2600 performs the reflection sound creation processing to generate pseudo rear-channel audio signals. The virtual surround processing section 1100 performs the virtual surround processing on these rear-channel audio signals to generate virtual surround signals. The volume of these virtual surround signals is decreased by 3 dB in the volume normalizing section 1200. Thereafter, the resultant virtual surround signals are output to the adder 1300 through the output switching section 1400. The adder 1300 adds together the virtual surround signals and the front-channel audio signals to output the resultant signals as signals for the front loudspeakers. In the process of addition, an overflow due to the addition process does not occur because the rear-channel audio signals and the virtual surround signals have been subjected to normalization in the volume normalizing section 1200. When the volume level of the signals output from the adder 1300 is an excessively large level, the volume level is automatically smoothed or compressed, whereby the overflow state can be relaxed. Then, the signals whose volume has been controlled by the automatic volume controller 2700 are output to the front loudspeaker side.

When the output channel type information indicates 4-channel output format, the virtual surround signals are generated as in the example of 2-channel output format. Thereafter, the front-channel audio signals are output as signals for the front loudspeakers, and the virtual surround signals are output as signals for the rear loudspeakers, without being subjected to the volume normalization in the volume normalizing section 1200, the addition in the adder 1300, or the volume control in the automatic volume controller 2700. Herein, although none of the volume normalization in the volume normalizing section 1200 and the automatic volume control in the automatic volume controller 2700 is performed on the audio signals, it is natural that no overflow occurs because the addition is not performed.

As described above, according to this embodiment, pseudo rear-channel signals are generated from front-channel audio signals, and therefore, even if the input signals are only front-channel audio signals, audio signals can be output according to the output channel type of a reproduction system which incorporates the audio processor of embodiment 2 while maintaining the optimum SN ratio of the entire reproduction system as in the processor of embodiment 1.

Since the automatic volume controller which adjusts the volume level according to the output channel type information is provided, the volume control process can be switched according to the output channel type, and as a result, an optimum volume control process can be achieved.

Embodiment 3

Figure 5:
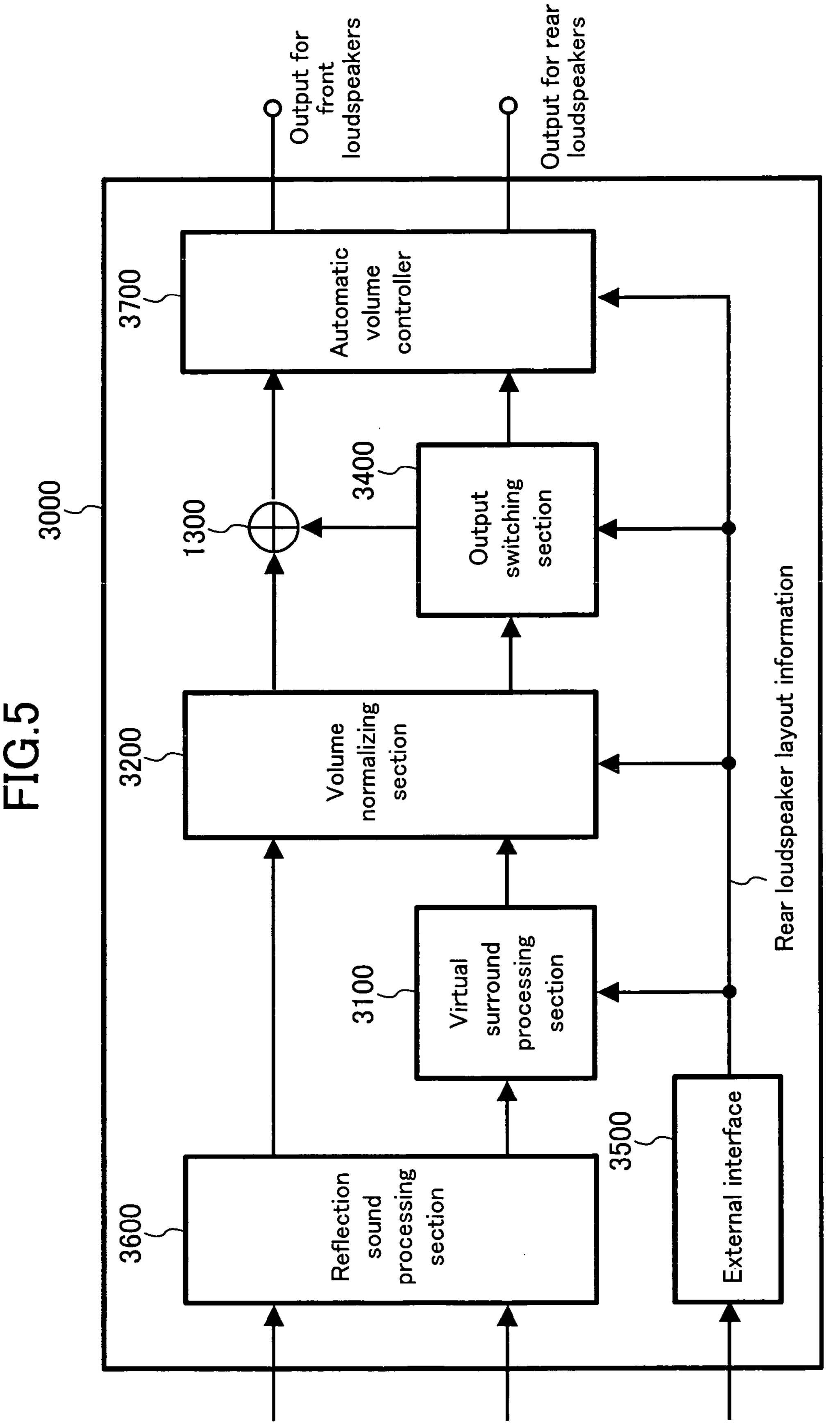
FIG. 5 is a block diagram showing a structure of an audio processor according to embodiment 3 of the present invention.

FIG. 5 is a block diagram showing a structure of an audio processor 3000 according to embodiment 3 of the present invention. The audio processor 3000 includes an adder 1300, an automatic volume controller 2700, a virtual surround processing section 3100, a volume normalizing section 3200, an output switching section 3400, an external interface 3500, a reflection sound processing section 3600, and an automatic volume controller 3700. The audio processor 3000 outputs audio PCM signals according to the layout of rear loudspeakers.

In this embodiment, the output control information is information indicative of the layout of rear loudspeakers in a reproduction system which incorporates the audio processor 3000 (rear loudspeaker layout information). The rear loudspeaker layout information indicates any of "rear layout" where the rear loudspeakers are placed at the rear of a listener, "front layout" where the rear loudspeakers are placed in front of a listener, and "none" where no rear loudspeakers are placed.

Figure 6:
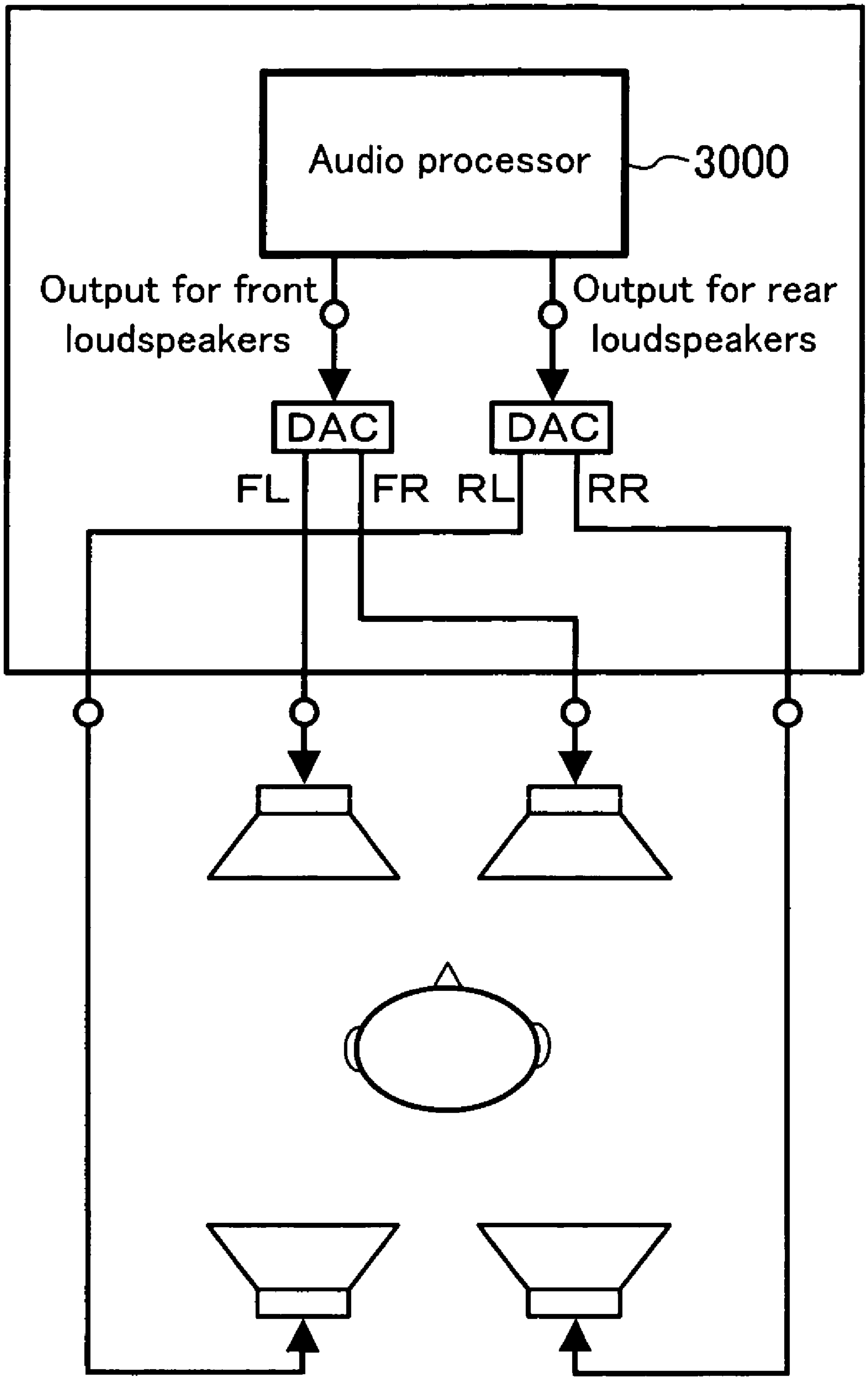
FIG. 6 shows an example of a structure of a reproduction system which incorporates the audio processor according to embodiment 3 of the present invention.

"Rear layout" represents the case where rear loudspeakers are placed at the rear of a listener of a reproduction system as in a normal multichannel system as shown in FIG. 6.

Figure 7:
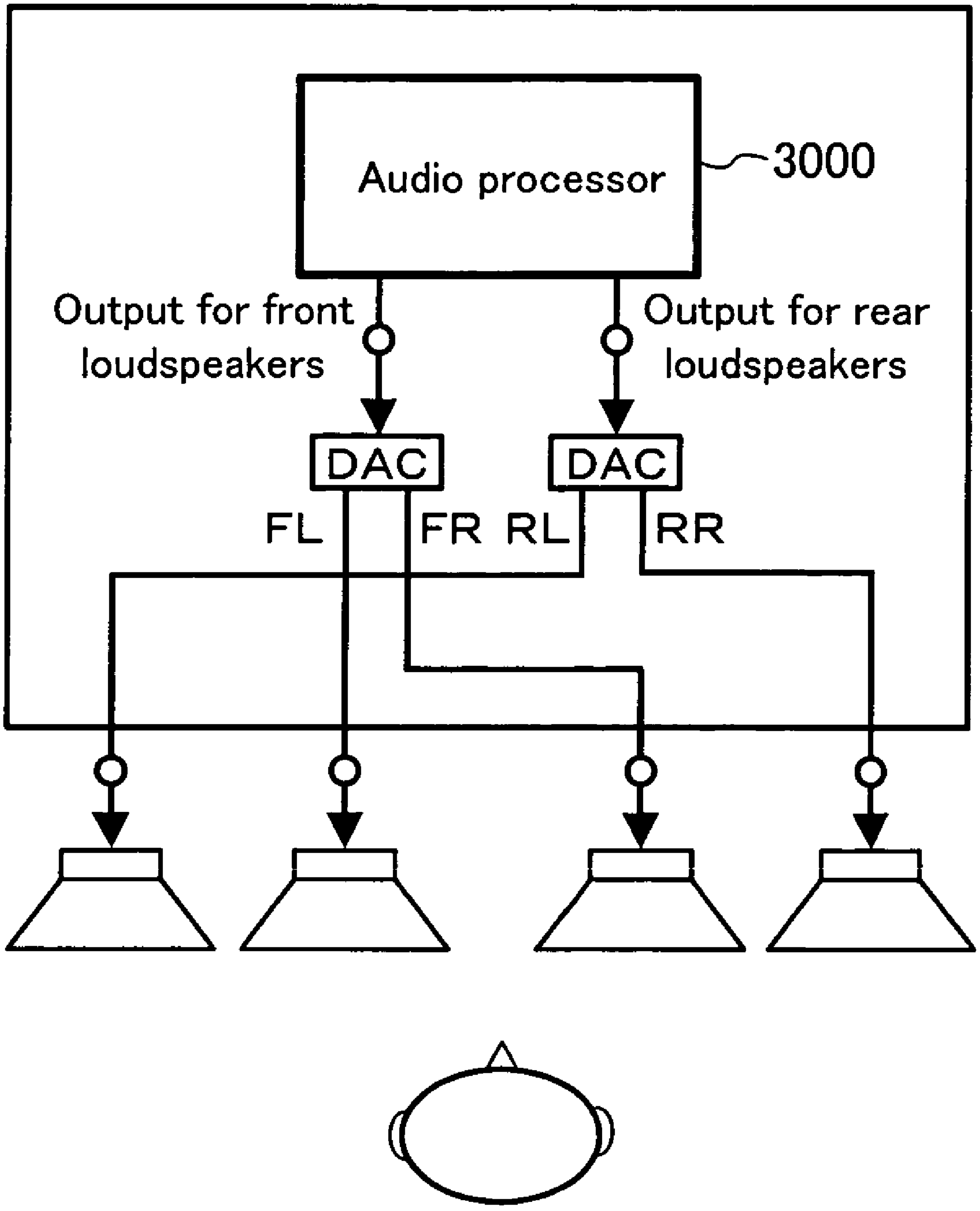
FIG. 7 shows an example of a structure of a reproduction system which incorporates the audio processor according to embodiment 3 of the present invention.
Figure 8:
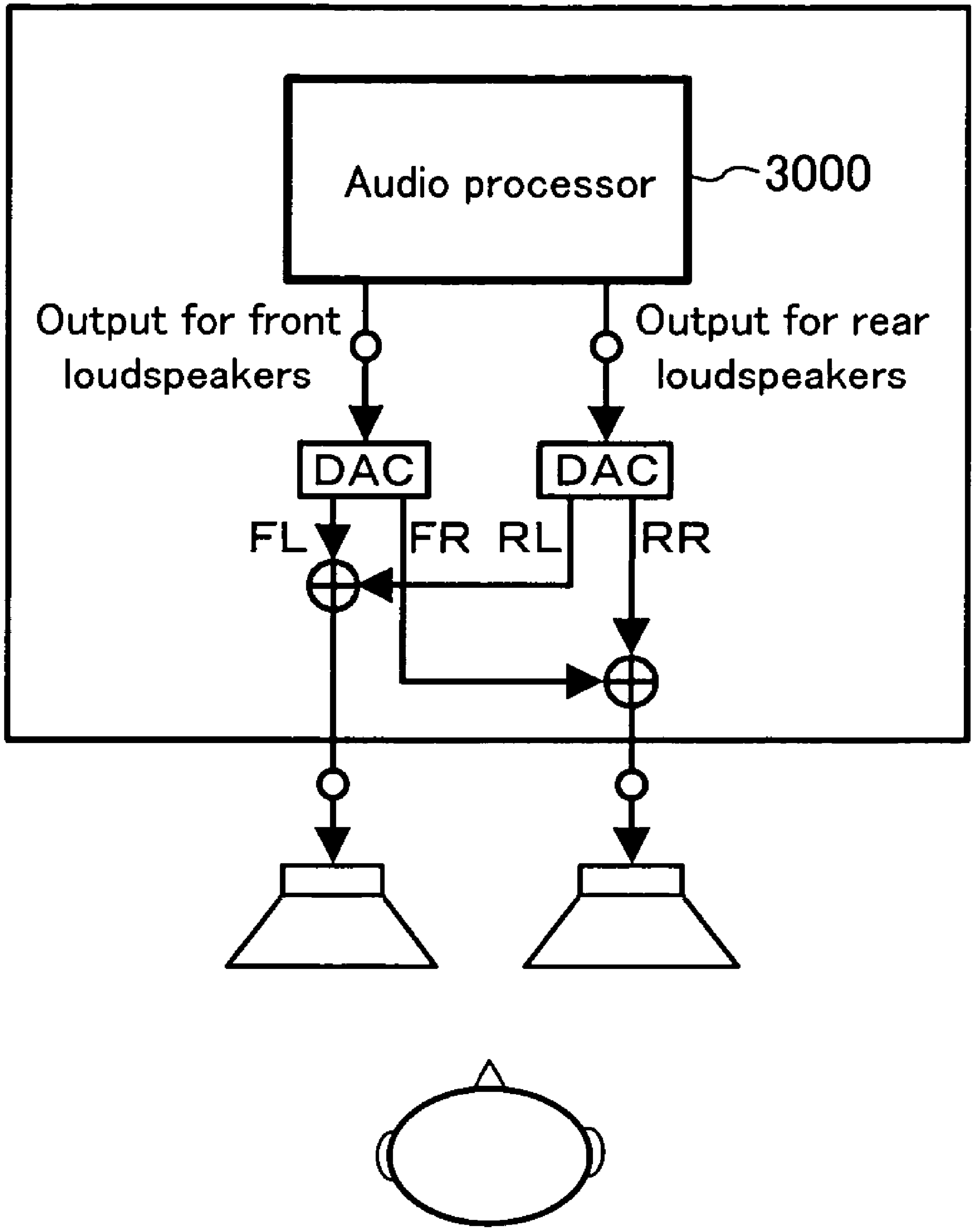
FIG. 8 shows an example of a structure of a reproduction system which incorporates the audio processor according to embodiment 3 of the present invention.

"Front layout" represents the case where rear loudspeakers are placed in front of a listener as shown in FIG. 7 or the case where a rear loudspeaker output and a front loudspeaker output are added together in an external analog circuit of the audio processor 3000 as shown in FIG. 8.

Figures 9, 10:
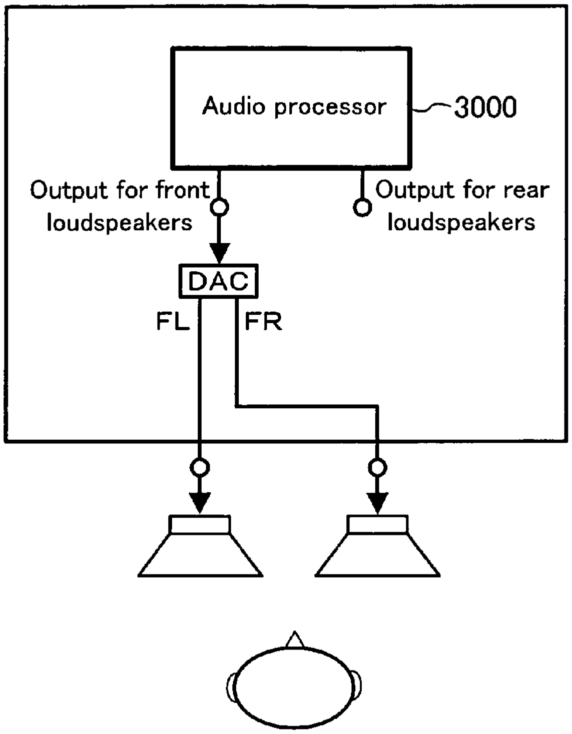
FIG. 9 shows an example of a structure of a reproduction system which incorporates the audio processor according to embodiment 3 of the present invention.
FIG. 10 is a table which shows the operation status of processing sections for rear loudspeaker layout information in the audio processor according to embodiment 3 of the present invention.

"None" represents the case where virtual surround signals and front-channel audio signals are added together inside the audio processor 3000 to provide front loudspeaker output as shown in FIG. 9.

The virtual surround processing section 3100 receives the rear loudspeaker layout information from the external interface 3500. If the rear loudspeaker layout information indicates any of "front layout" and "none", the virtual surround processing section 3100 performs the virtual surround processing on the front-channel audio signals to output virtual surround signals. If the rear loudspeaker layout information indicates "rear layout", the virtual surround processing section 3100 passes the front-channel audio signals therethrough without performing the virtual surround processing.

The external interface 3500 outputs the rear loudspeaker layout information to the virtual surround processing section 3100, the volume normalizing section 1200, the output switching section 1400 and the automatic volume controller 2700.

If the rear loudspeaker layout information output from the external interface 3500 indicates "none", the volume normalizing section 3200 decreases the level of the front-channel audio signals and the virtual surround signals generated by the virtual surround processing section 3100 by 3 dB. The reason why the decrease in signal level by the volume normalizing section 3200 in embodiment 3 is not 6 dB as in embodiment 1 but 3 dB is that the audio processor 3000 includes the automatic volume controller 2700, and accordingly, some degree of overflow can be avoided.

The output switching section 3400 outputs the virtual surround signals to the adder 1300 only if the rear loudspeaker layout information output from the external interface 3500 indicates "none". If the rear loudspeaker layout information indicates "front layout" or "rear layout", the output switching section 3400 outputs the virtual surround signals to the rear loudspeaker output side.

The reflection sound processing section 3600 externally receives audio PCM signals of 4 channels in total, i.e., front-channel audio signals for front left and right reproduction and rear-channel audio signals for rear left and right reproduction, and performs the reflection sound creation processing on the front-channel audio signals and the rear-channel audio signals. In this embodiment, reflection sound can be added to the audio signals of all the channels. Even when rear-channel audio signals are not input, for example, pseudo rear-channel signals can be generated by performing the reflection sound creation processing on the front-channel audio signals.

When reflection sound is added to a channel already existing at the time of input, the reflection sound processing section 3600 performs volume normalization in advance.

The automatic volume controller 3700 performs volume level control (e.g., smoothing or compression) on input signals according to the rear loudspeaker layout information. Specifically, only if the rear loudspeaker layout information output from the external interface 3500 indicates "none", the volume control is carried out according to the volume level of the input signals. If the rear loudspeaker layout information indicates "front layout" or "rear layout", the automatic volume controller 3700 simply passes the input signals therethrough. With this, for example, when the volume level of input signals is an excessively large level, the volume level is smoothed or compressed, whereby the overflow state can be relaxed.

FIG. 10 is a table that illustrates the operation of the virtual surround processing section 3100, the volume normalizing section 3200, the output switching section 3400, and the automatic volume controller 3700 for respective rear loudspeaker layouts.

Figure 11:
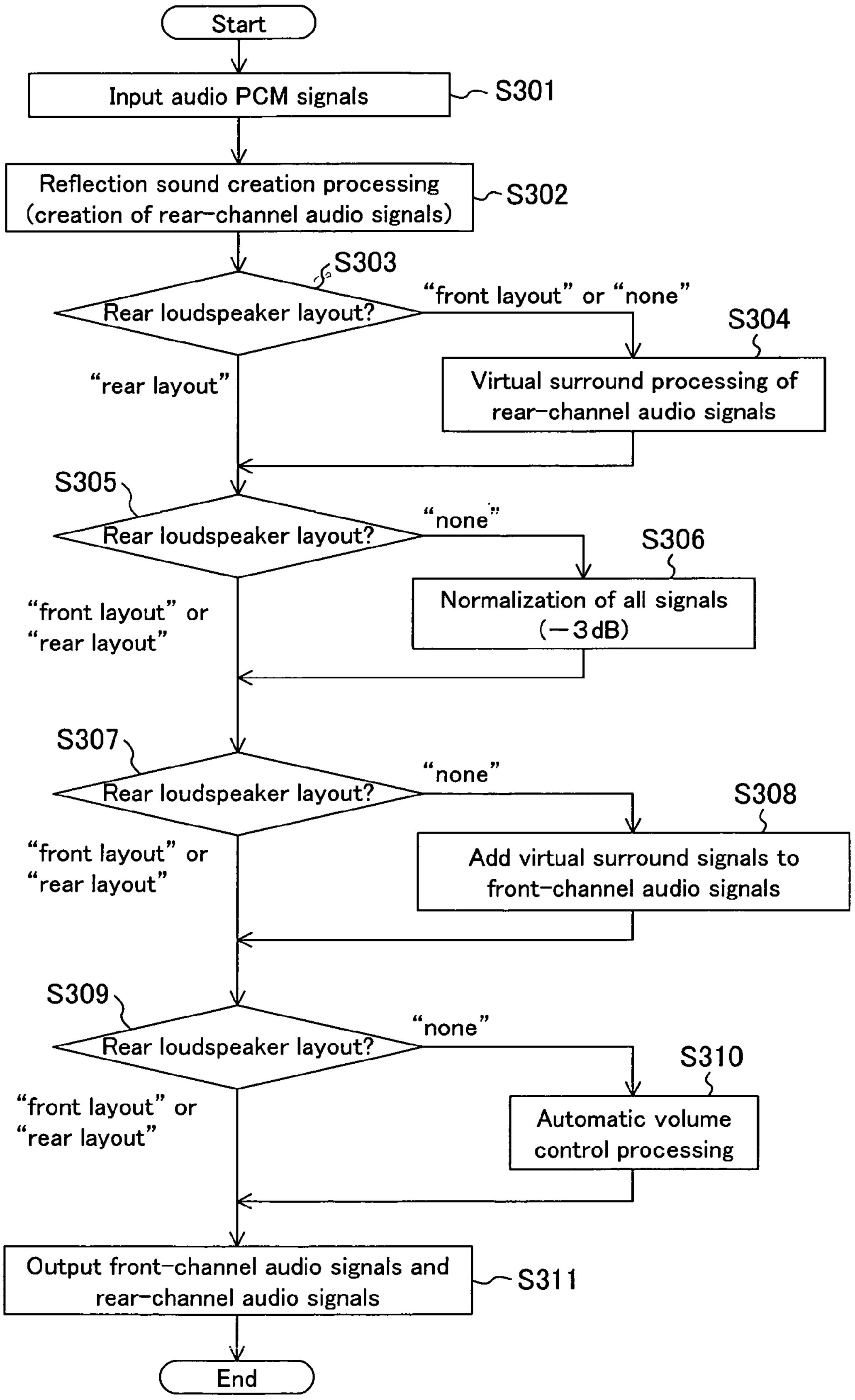
FIG. 11 is a flowchart illustrating an operation of the audio processor according to embodiment 3 of the present invention.
Figure 12:
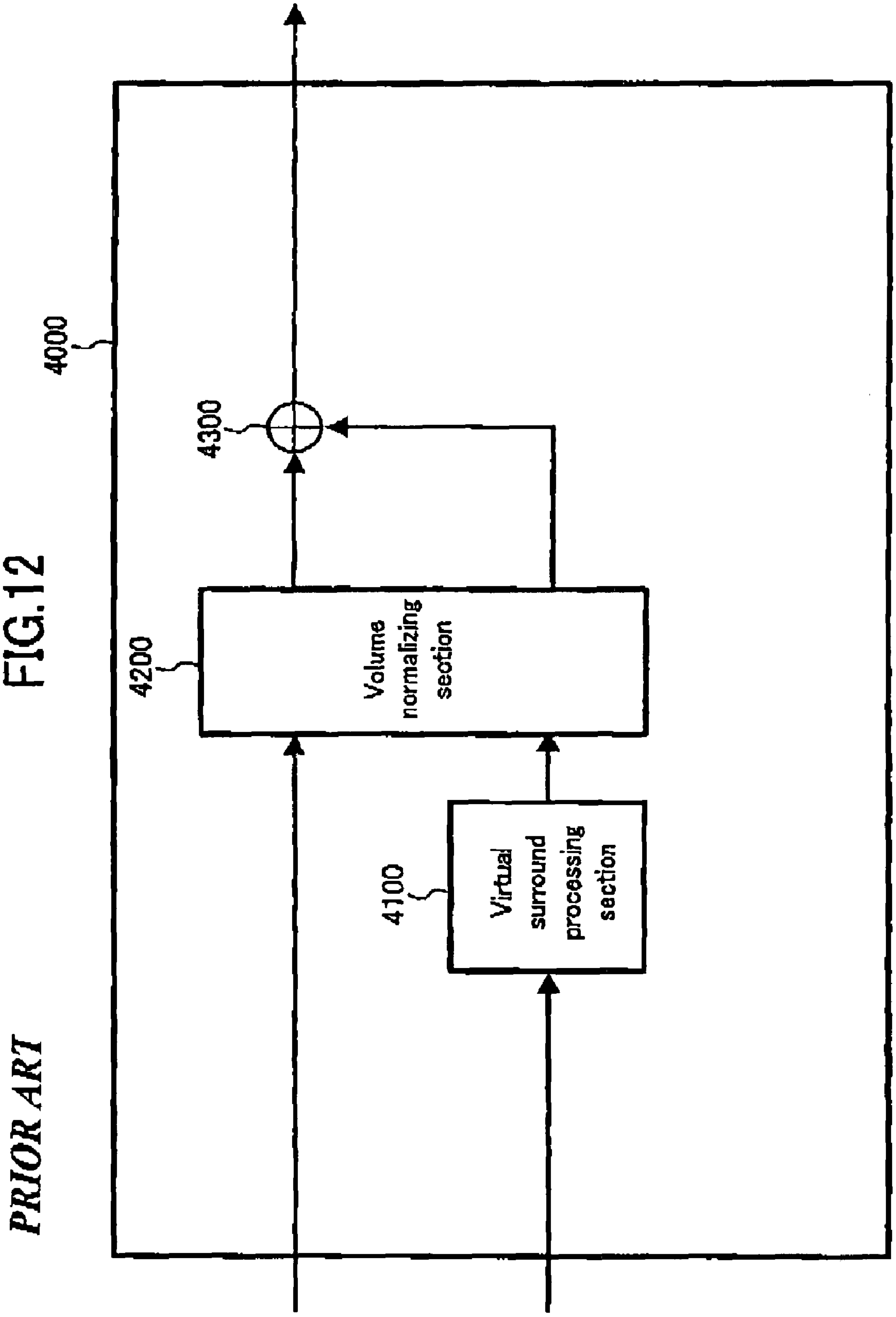
PRIOR ART FIG.12
FIG. 12 is a block diagram showing a structure of a conventional audio processor.
Figure 13:
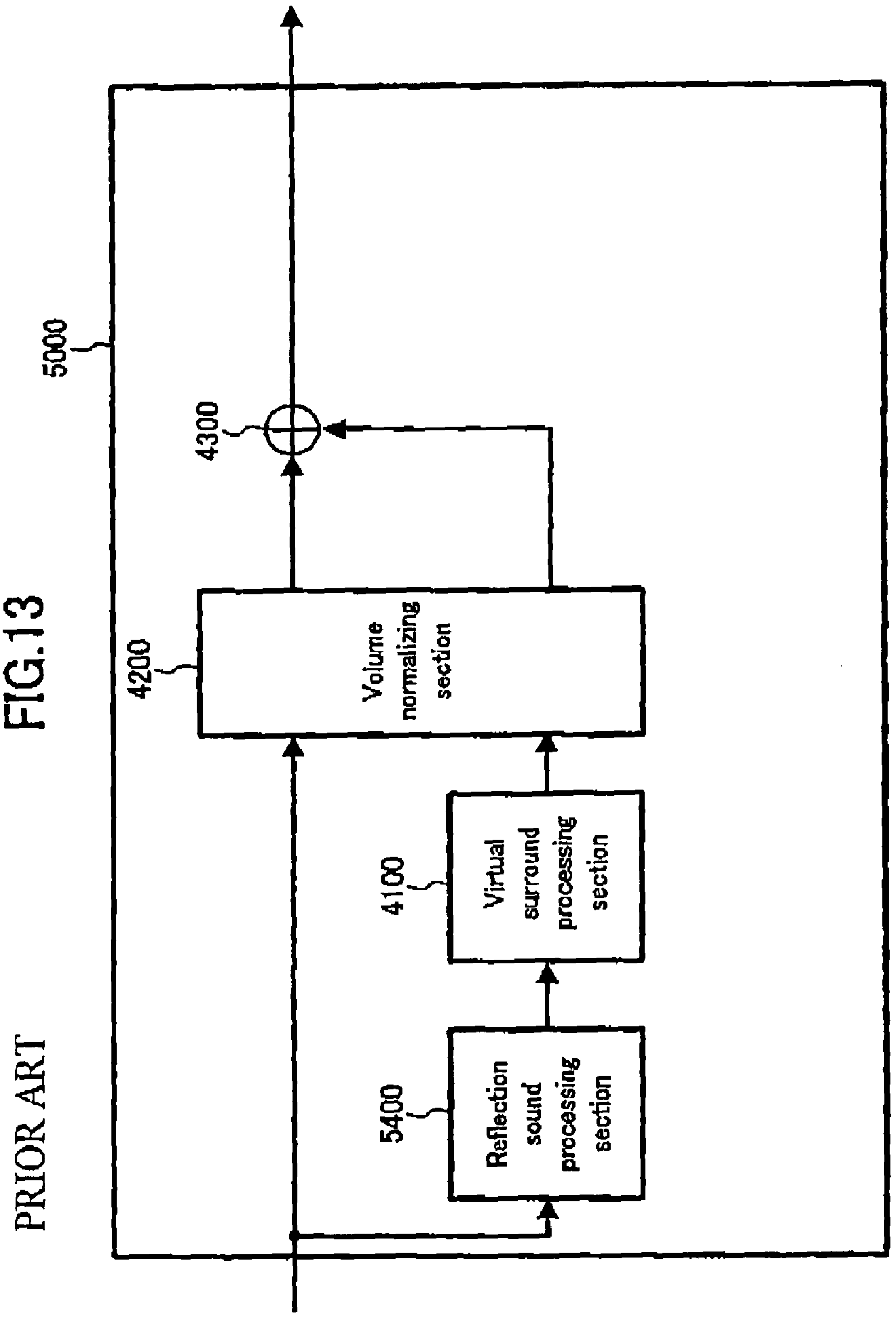
FIG.13 PRIOR ART
FIG. 13 is a block diagram showing a structure of a conventional audio processor.

The audio processor 3000 as constructed above performs the output operation according to the layout of the rear loudspeakers, i.e., the layout where the rear loudspeakers are placed at the rear of a listener, the layout where the rear loudspeakers are placed in front of a listener, or the layout where no rear loudspeakers are placed, through the processes of the steps illustrated in the flowchart of FIG. 11. At the respective steps, the following processes are performed.

Audio PCM signals are input to the reflection sound processing section 3600.

The reflection sound processing section 3600 performs the reflection sound creation processing on front-channel audio signals and rear-channel audio signals to add reflection sound.

The virtual surround processing section 3100 analyzes the rear loudspeaker layout information output from the external interface 3500. If the rear loudspeaker layout information indicates "front layout" or "none", the operation proceeds to the process of step S304 for the virtual surround processing. If the rear loudspeaker layout information indicates "rear layout", the virtual surround processing section 3100 simply passes the rear-channel audio signals therethrough, and the operation proceeds to the process of step S305.

The virtual surround processing section 3100 performs the virtual surround processing on the rear-channel audio signals output from the reflection sound processing section 3600 to output virtual surround signals to the volume normalizing section 3200.

The volume normalizing section 3200 analyzes the rear loudspeaker layout information output from the external interface 3500. If the rear loudspeaker layout information indicates "none", the operation proceeds to the process of step S306 for volume normalization. If the rear loudspeaker layout information indicates "front layout" or "rear layout", the volume normalizing section 3200 simply passes the rear-channel audio signals and the virtual surround signals therethrough, and the operation proceeds to the process of step S307.

The reflection sound processing section 3600 performs volume normalization on front-channel audio signals and rear-channel audio signals. Specifically, the reflection sound processing section 3600 decreases the volume of these signals by 3 dB.

With this, occurrence of an overflow is prevented in the addition of the front-channel audio signals and the virtual surround signals.

The output switching section 3400 analyzes the rear loudspeaker layout information in order to determine to which section the virtual surround signals are to be output. If the rear loudspeaker layout information indicates "none", the output switching section 3400 outputs the virtual surround signals to the adder 1300, and then, the operation proceeds to the process of step S308. If the rear loudspeaker layout information indicates "front layout" or "rear layout", the output switching section 3400 simply passes the rear-channel audio signals therethrough, and the operation proceeds to the process of step S309.

The adder 1300 adds together the front-channel audio signals and the virtual surround signals, and then, the operation proceeds to the process of step S309.

The automatic volume controller 3700 analyzes the rear loudspeaker layout information in order to determine whether or not the automatic volume control is necessary. If the rear loudspeaker layout information indicates "none", the operation proceeds to the process of step S310 for volume adjustment. If the rear loudspeaker layout information indicates "front layout" or "rear layout" (i.e., if volume adjustment is unnecessary), the operation proceeds to the process of step S311.

The automatic volume controller 3700 adjusts the volume of the front-channel audio signals and the virtual surround signals by smoothing or compressing the volume level.

Outputs of the automatic volume controller 3700 are output as signals for the front loudspeakers and signals for the rear loudspeakers.

By performing the processes of steps S301 through S311, the output operation is performed according to the layout of the rear loudspeakers, i.e., the layout where the rear loudspeakers are placed at the rear of a listener, the layout where the rear loudspeakers are placed in front of a listener, or the layout where no rear loudspeakers are placed.

For example, in a reproduction system where rear loudspeakers are placed as shown in FIG. 6, if the input rear loudspeaker layout information indicates "rear layout", the reflection sound processing section 3600 performs volume normalization on input 4-channel audio PCM signals and adds reflection sound. The virtual surround processing section 3100 simply passes the rear-channel audio signals output from the reflection sound processing section 3600 therethrough without performing the virtual surround processing.

The volume normalizing section 3200 simply passes the front-channel audio signals output from the reflection sound processing section 3600 and the rear-channel audio signals output from the virtual surround processing section 3100 therethrough without performing volume normalization.

Since the output switching section 3400 outputs the rear-channel audio signals received from the volume normalizing section 3200 to the adder 1300, the front-channel audio signals are independently input to the automatic volume controller 3700. The automatic volume controller 3700 also simply passes the front-channel audio signals and the rear-channel audio signals, which are then output as signals for the front loudspeakers and signals for the rear loudspeakers, respectively.

As described above, if the input rear loudspeaker layout information indicates "rear layout", input 4-channel audio PCM signals are output to the outside without being subjected to the volume normalization of the volume normalizing section 3200 or the automatic volume control of the automatic volume controller 3700. For example, in a reproduction system constructed as shown in FIG. 6, surround reproduction can be realized without deteriorating the SN ratio.

Alternatively, for example, in a reproduction system where loudspeakers are placed as shown in FIG. 7 or FIG. 8, if the input rear loudspeaker layout information indicates "front layout", the virtual surround processing section 3100 performs an operation different from that performed in the case of "rear layout". Specifically, the virtual surround processing section 3100 performs the virtual surround processing on the rear-channel audio signals output from the reflection sound processing section 3600 to generate virtual surround signals.

As described above, rear-channel audio signals and virtual surround signals are output to the outside without being subjected to the volume normalization of the volume normalizing section 3200 or the automatic volume control of the automatic volume controller 3700. For example, in a reproduction system constructed as shown in FIG. 7, front-channel audio signals are output through front loudspeakers, and virtual surround signals are output through rear loudspeakers placed in front of a listener. Thus, virtual surround reproduction can be realized without deteriorating the SN ratio. For example, in a reproduction system constructed as shown in FIG. 8, a front loudspeaker output and a rear loudspeaker output are added together in an external analog circuit, whereby virtual surround reproduction can also be realized.

For example, in a reproduction system where loudspeakers are placed as shown in FIG. 9, if the input rear loudspeaker layout information indicates "none", the reflection sound processing section 3600 performs volume normalization on input 4-channel audio PCM signals and adds reflection sound to the signals. The virtual surround processing section 3100 performs the virtual surround processing on rear-channel audio signals generated by the reflection sound processing section 3600 to generate virtual surround signals.

The volume normalizing section 3200 performs volume normalization on the front-channel audio signals and the virtual surround signals. Specifically, the volume normalizing section 3200 decreases the volume of each of these signals by 3 dB.

The output switching section 3400 outputs the virtual surround signals received from the volume normalizing section 3200 to the adder 1300, and the adder 1300 adds together the front-channel audio signals and the virtual surround signals. The resultant signals are input to the automatic volume controller 3700. The automatic volume controller 3700 performs volume control on the output of the adder 1300 according to the volume level of the signals to output the resultant signals for front loudspeakers. The volume control in the automatic volume controller 3700 provides the effect of relaxing the overflow state by automatically smoothing or compressing the volume level as in the processor of embodiment 2 when the volume level of the input signals is an excessively large level, for example.

In this way, addition is performed after volume normalization of the volume normalizing section 3200 has been performed, and signals are output to the outside after being subjected to automatic volume control in the automatic volume controller 3700. Therefore, overflow does not occur in the addition process or at the time of external output. For example, virtual surround reproduction can be realized with a reproduction system constructed as shown in FIG. 9.

As described above, according to this embodiment, since the output switching section 3400 is provided, virtual surround signals and 2-channel signals for front reproduction can be independently output without being added together irrespective of the presence/absence (ON/OFF) of the virtual surround processing. Therefore, it is not necessary to decrease the reproduction volume in the case of OFF in order to adjust the sound voluminosity between the case where the virtual surround processing is ON and the case where the virtual surround processing is OFF. Thus, the SN ratio of the entire reproduction system can be maintained.

With externally-input output channel type information, the presence/absence of volume normalization in the volume normalizing section, the presence/absence of volume level adjustment in the automatic volume controller, and the presence/absence of addition of the virtual surround signals and the front-channel audio signals are automatically switched according to an external output channel type. Thus, the volume is optimally set according to the form of a reproduction system which incorporates the processor of embodiment 3, and as a result, the SN ratio of the entire reproduction system is automatically optimized.

In this embodiment, since the output channel type information is input, presence/absence of the virtual surround processing can be controlled according to the layout or output format of loudspeakers for rear reproduction.

In the processor of embodiment 3, in the case where, for example, a reproduction system which incorporates the audio processor of embodiment 3 is constructed, the function of transmitting the position information, i.e., the rear loudspeaker layout information, is added to rear loudspeakers as an interface with the audio processor to automatically control the presence/absence of the virtual surround processing, the output channel type, the volume level, etc. With this, optimum reproduction can be automatically realized.

In the processors of embodiments 1 and 3, the externally-input signals are front 2-channel signals and rear 2-channel signals, i.e., audio PCM signals of 4 channels in total, for convenience of illustration. However, the present invention may be applied to an example where the externally-input signals include a channel for front center reproduction, a subwoofer channel, or the like, or an example where the rear reproduction channel is a monaural channel.

As to the process which is performed based on the output channel type information of the automatic volume controller in the processor of embodiment 3, an example of switching the presence/absence (ON/OFF) of volume control has been described. However, it is also possible that the effect of the volume control process is variable according to the setting of the reflection sound processing section or the volume normalizing section.

Also in the processor of embodiment 3, in the case where the externally-input audio signals are audio PCM signals of right and left channels (2 channels) for front reproduction, pseudo rear-channel audio signals may be generated in the reflection sound processing section 3600 and subjected to the virtual surround processing.

INDUSTRIAL APPLICABILITY

An audio processor according to the present invention possesses the effect of enabling virtual surround reproduction with small deterioration in the SN ratio of an entire reproduction system and is useful as, for example, an audio processor which realizes multichannel reproduction in a virtual manner only with front loudspeakers placed in front of a listener.

The invention claimed is:

1. An audio processor, comprising an audio processing section for performing a predetermined sound image localization process on a rear-channel audio signal whose sound image position perceived by a listener when reproduced through a loudspeaker placed at the rear of the listener is at the rear of the listener such that the sound image position perceived by the listener when the signal is reproduced through a loudspeaker placed in front of the listener is at the rear of the listener to generate a sound image localized audio signal;

a volume normalizing section for controlling the volume level of a front-channel audio signal and the sound image localized audio signal to be within a predetermined level range, according to a control signal indicative of output control information outputted by an interface;

an adder for adding together the front-channel audio signal whose volume level has been controlled in the volume normalizing section and the sound image localized audio signal whose volume level has been controlled in the volume normalizing section to generate a sum audio signal to be reproduced through the loudspeaker in front of the listener; and a switching section for selectively performing an operation of outputting the sound image localized audio signal to the adder and an operation of outputting the sound image localized audio signal to the loudspeaker placed at the rear of the listener according to the control signal indicative of output control information, wherein the front-channel audio signal is reproduced through the loudspeaker in front of the listener and the sound image localized audio signal is reproduced through the loudspeaker at the rear of the listener when the switching section outputs the sound image localized audio signal to the loudspeaker at the rear of the listener, wherein the sum audio signal is reproduced through the loudspeaker in front of the listener when the switching section outputs the sound image localized audio signal to the adder, wherein the output control information includes output channel type information which is indicative of an output channel type, and the switching section performs the switching according to the output channel type information.

2. The audio processor of claim 1, further comprising a reflection sound creation section for performing a reflection sound creation process on an input front-channel audio signal to generate the rear-channel audio signal.

3. The audio processor of claim 1, further comprising a reflection sound adding section for adding a reflection sound signal to each of an input front-channel audio signal and an input rear-channel audio signal to generate the front-channel audio signal and the rear-channel audio signal.

4. The audio processor of claim 1, further comprising a volume controller for controlling the volume level of an output audio signal according to the output channel type information and an input volume level.

5. The audio processor of claim 1, wherein:

the output control information includes rear loudspeaker layout information indicative of whether a layout of a loudspeaker for rear sound image through which an audio signal is output such that a sound image position perceived by a listener is at the rear of the listener is a layout where the loudspeaker is placed in front of the listener, a layout where the loudspeaker is placed at the rear of the listener, or a layout where the loudspeaker is not provided;

the audio processing section controls whether or not to generate the sound image localized audio signal according to the layout indicated by the rear loudspeaker layout information; and the switching section selectively performs according to the rear loudspeaker layout information an operation of outputting the front-channel audio signal and the sound image localized audio signal independently of each other, an operation of outputting the sum audio signal, and an operation of outputting an input audio signal as it is.

6. The audio processor of claim 5, further comprising a volume controller for controlling the volume level of an output audio signal according to the rear loudspeaker layout information and an input volume level.

* * * * *